United States Patent
Ivanov (10) Patent No.: US 8,230,416 B2
(45) Date of Patent: Jul. 24, 2012

(54) SYSTEM, METHOD AND ARTICLE OF MANUFACTURE FOR USING SHADOW INSTALLATIONS OF SOFTWARE MODULES DURING DISTRIBUTED SYSTEM UPGRADE

(75) Inventor: Ivan Ivanov, Sofia (BG)

(73) Assignee: SAP AG, Walldorf (DE)

( * ) Notice: Subject to any disclaimer, the term of this patent is extended or adjusted under 35 U.S.C. 154(b) by 1150 days.

(21) Appl. No.: 11/967,700

(22) Filed: Dec. 31, 2007

(65) Prior Publication Data

US 2009/0172655 A1    Jul. 2, 2009

(51) Int. Cl.
*G06F 9/45* (2006.01)
(52) U.S. Cl. ........................................... 717/173
(58) Field of Classification Search ........... 717/168–178
See application file for complete search history.

(56) References Cited

U.S. PATENT DOCUMENTS

| 6,070,012 A * | 5/2000 | Eitner et al. ............... 717/168 |
| 2003/0130985 A1* | 7/2003 | Driesen et al. ............... 707/1 |
| 2006/0047974 A1* | 3/2006 | Alpern et al. ............... 713/191 |
| 2008/0256528 A1* | 10/2008 | Waitzmann et al. ........... 717/172 |

* cited by examiner

*Primary Examiner* — Philip Wang
(74) *Attorney, Agent, or Firm* — Blakely, Sokoloff, Taylor & Zafman, LLP (57) ABSTRACT

A method, system and article of manufacture for upgrade of a software module executed in a distributed software computer system using shadow installations of software modules for minimum downtime. A first software module is executed on a first host and a second software module is executed on a second host, the two software modules in communication with each other. Target release of the first software module and a local release of the second software module are installed and deployed on the first host during the execution of the first software module. The first software module is switched to the target release in communication with the local release of the second software module. The communication with the second software module is reestablished after the upgrade.

25 Claims, 5 Drawing Sheets

SYSTEM, METHOD AND ARTICLE OF MANUFACTURE FOR USING SHADOW INSTALLATIONS OF SOFTWARE MODULES DURING DISTRIBUTED SYSTEM UPGRADE

FIELD OF INVENTION

The field of invention relates generally to the software arts, and, more specifically, to upgrading distributed software applications.

BACKGROUND

The continuous information technology (IT) development has to satisfy fast growing business demands. In recent years we are witnessing evolving solutions aimed to provide comprehensive online functionality, high availability, and simultaneous multi-application execution for multiuser environments. The growing complexity of the software products means growing complexity of the procedures for upgrade of the products to new releases. Further, there is the increasing demands for high availability and continuous application execution. It is no longer satisfactory directly to install a new version of a software system over the old version as it would lead to huge downtime. Therefore, an approach for upgrading software system with a shadow system was introduced (See US Patent Application publication No. US 2003-0130985 A1). This approach is also referred as a switch upgrade.

The switch upgrade approach involves a complete installation of a new release of a software system (module, application) from scratch while the software system to be upgraded is still running in production mode. This new release is often called a shadow system. Thus, the most time consuming activities of an upgrade procedure (e.g. installation and deployment) are accomplished without interrupting the productive mode. When the installation and the deployment of the shadow application are done, the switch upgrade downtime starts. At that moment the productive system and the shadow system are stopped and switched by adapting, synchronizing and migrating the relevant system and customer data. The switch upgrade requires minimum downtime to upgrade the productive system to the new release.

In many current scenarios the productive software application to be upgraded is executed in a distributed system environment. There are many definitions for a distributed system. In this document a distributed system should be understood as a plurality of software modules running in parallel on separate hosts.

In a distributed system environment the upgrade of a software module running on one host often, if not always, requires communication with another software module running on a separate host, or even modification of the latter. In such an environment the switch upgrade approach has to be modified in order to effectively comply with the minimum downtime requirement.

SUMMARY

A method, system and article of manufacture for upgrade of a software module executed in a distributed software computer system with minimum downtime are described. A first software module is executed on a first host and a second software module is executed on a second host, the two software modules in communication with each other. Target release of the first software module and a local release of the second software module are installed and deployed on the first host, not interrupting the execution of the first software module. The first software module is stopped and switched to the target release in communication with the substitute of the second software module. The communication with the second software module and the productive mode is reestablished after the switch.

BRIEF DESCRIPTION OF THE DRAWINGS

A better understanding of the present invention can be obtained from the following detailed description in conjunction with the following drawings, in which.

DETAILED DESCRIPTION

Embodiments of a method, system and machine accessible medium for switch upgrade of a software module in a distributed system by using shadow software modules installations are described herein.

When a first software module switch upgrade requires the first software module to be in communication with a second software module executed on a separate host, the embodiments of the invention involve shadow installation and deployment of the second software on the same host where the first software module is executed. Thus, a shadow installation of a target release of the first module interacts with the shadow installation of the second software module during the deployment and online setup procedures. Online procedures in a software module are those procedures which take place while the software module is running. The shadow installation of the second module is also applied in the deployment and online setup of the new release of the first software module.

Figure 1:
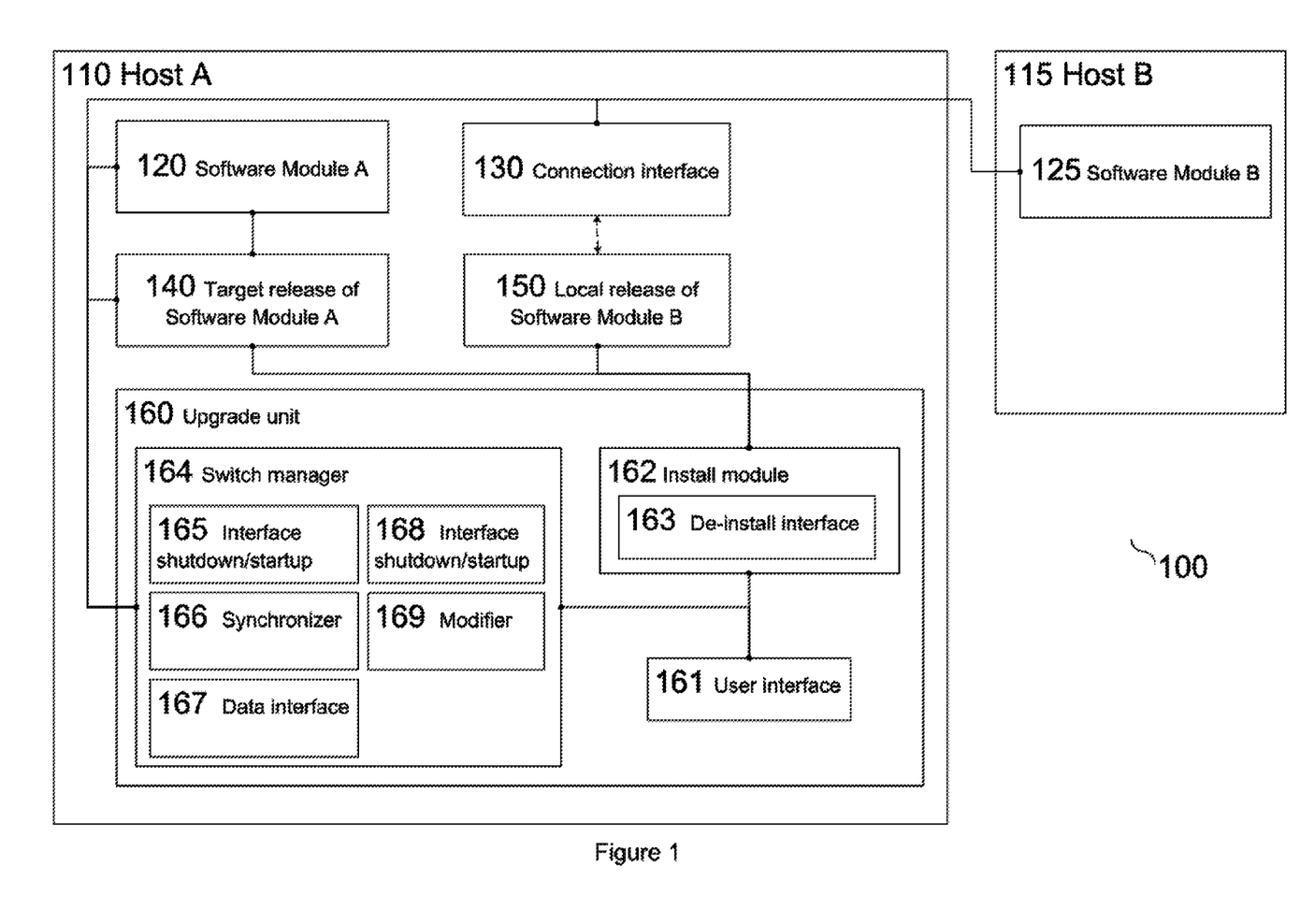
FIG. 1 illustrates a block diagram of a distributed system that implements switch upgrade of a software module using installations of shadow software modules.

FIG. 1 illustrates a conceptual distributed system 100 in which the software module switch upgrade is implemented. Distributed system 100 comprises two separate hosts—host A 110 and host B 115. On host A 110 is running software module A 120 which is to be upgraded to a new release. During its execution, software module A 120 communicates with software module B 125 running on host B 115. In one embodiment of the invention the communication between software module A 120 and software module B 125 flows through connection interface 130 on host A 110.

The switch upgrade of software module A 120 is a process managed by upgrade unit 160. In one embodiment, upgrade unit 160 comprises user interface 161, install module 162 and switch manager 164. User interface 161 provides user access for configuring, initiating and administrating the upgrade. In one embodiment of the invention the upgrade process reports its status using user interface 161. In yet another embodiment of the invention the upgrade process utilizes user interface 161 to prompt a user to perform different upgrade activities when required.

Installations of shadow software modules is a prerequisite for the switch upgrade process. Installer 162 performs installation of a target release of software module A 140 and of a local release of software module B 150 on host A 110. In an embodiment of the invention, the installer performs also deployment of the installed shadow software modules. The installation and deployment of the shadow software modules are done while software module A is running in a productive mode. Thus, the most time consuming upgrade activities do not hinder the business availability of software module A 120. Installer 162 may comprise de-install interface 163 to de-install shadow software modules after the switch upgrade.

When the installation and deployment of shadow modules is done, the downtime phase of the switch upgrade process starts where software module A 120 is upgraded to the target release. Switch manager 164 is responsible for handling the tasks in this phase. In one embodiment of the invention switch manager 164 directs connection interface 130 to terminate the communication between software module A 120 and software module B 125, and to establish a communication between software module A 120 and the local release of software module B 150. In another embodiment of the invention instead of managing connection interface 130 directly, switch manager 164 prompts a user through user interface 161.

Switch manager 164 may comprise a set of sub-modules as illustrated in FIG. 1. Sub-modules may include: interface 165 to shutdown and startup software module A 120 and target release of software module A 140; synchronizer 166; and data interface 167. The last two sub-modules are responsible for the actual (physical) upgrade of software module A 120 to the target release. Synchronizer 166 is operable to update a number of system files of software module 120 in accordance with a number of system files of target release of software module A 140. The update is executed in a non-destructive manner to preserve any important customizations (e.g. system preferences, user profiles, product definitions, etc.) in the system files of software module A 120. In another embodiment, system files of software module A 120 are not updated, instead system files of target release of software module A 140 are updated with the important customizations.

In addition to system files synchronization, the physical upgrade also migrates a persisted data in software module A 120 to the new release. The migration comprises restructuring the persisted data when the new release presents changes to persisted data structure, and adapting the persisted data to fit in the changed structure. The migration is handled by data interface 167 sub-module.

In an embodiment of the invention the upgrade of software module A 120 might further require changes to software module B 125 which is executed to host B 115. Switch manager 164 handles this requirement with two additional sub-modules—interface 168 to initiate shutdown and startup of software module B 125, and modifier 169 to update and reconfigure software module B 125 in accordance with the upgrade requirements.

Figure 2:
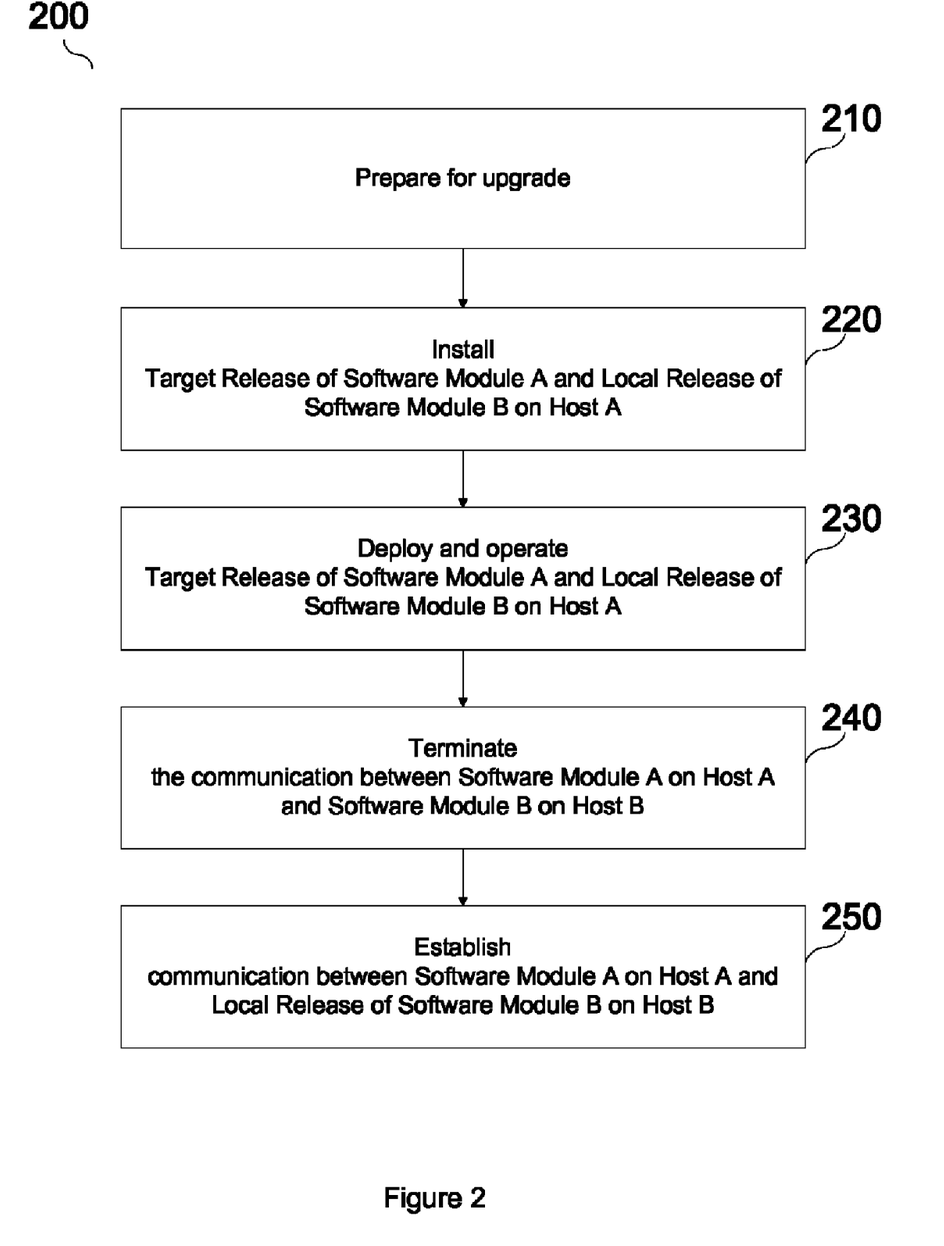
FIG. 2 illustrates a flowchart of installing shadow software modules for switch upgrade of a software module.

FIG. 2 is a flowchart 200 illustrating installing shadow software modules for switch upgrade of software module A 120 in distributed system 100. The different blocks in the flowchart represent different tasks of the switch upgrade process performed while software module A 120 is in production state. To prepare the switch upgrade, at block 210 a system check is performed to confirm that all hardware and software upgrade requirements are satisfied. The preparation further may include installing specific system software or even additional hardware elements like volatile memory. Block 210 involves also activities such as estimating the system downtime period, and planning the upgrade tasks in accordance with the application load schedule and the available resources.

When distributed system 100 is prepared for upgrade the upgrade process continues at block 220 with installing the shadow software modules, i.e. target release of software module A 140 and local release of software module B 150. Software module 150 is referenced as a local release of software module B because it is installed on host A, the local host for software module A 120. However, the version of local release of software module B 150 may differ from the version of software module B 125 and may correspond to the version of target release of software module A 140.

The next task in the switch upgrade process is deployment of the shadow modules at block 230. The deployment of a software module usually requires significant resources in terms of system time and system administration. With the deployment, target release of software module A 120 is setup and ready for execution on host A 110. Some of the deployment activities of a software module in a distributed system could require communication with a second software module. Therefore, for the switch upgrade of a software module in a distributed system it is essential to have a shadow installation of the second software module. Thus, at block 230 the local release of software module B 150 is also deployed. The two shadow installations of software modules might communicate with each other during the deploy process and when running.

The last task in switch upgrade process, performed while the distributed system is in a productive mode, is illustrated at block 240. It is the termination of the communication between software module A 120 on host A 110 and software module B 125 on host B 115. With this, the distributed system 100 enters a downtime period. The downtime period is opposite to the production mode period and represents the stage in which the business functionality of the distributed system is not available to the users. At block 250 is illustrated another action that is not necessarily pertinent to the productive mode, but doesn't explicitly require downtime mode. This is establishing a communication between software module A 120 and local release of software module B 150. The purpose is to ensure proper running of software module A 120 during the switch upgrade process in downtime period when there is no communication with software module B 125.

Figure 3:
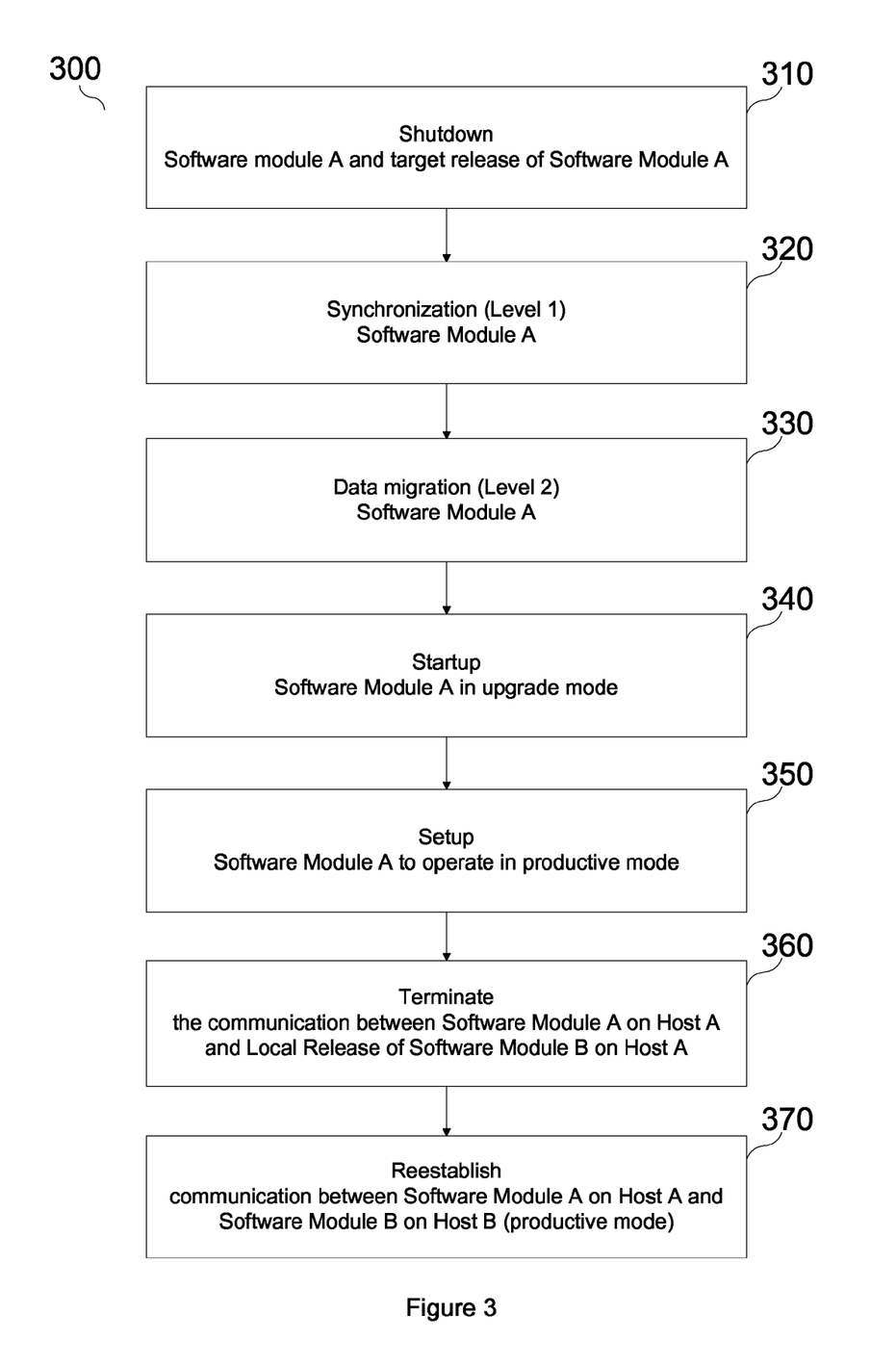
FIG. 3 illustrates a flowchart of switch upgrade of a software module using installations of shadow software modules according to an embodiment of the invention.

FIG. 3 illustrates a flowchart of switch upgrading software module A 120 using the shadow software modules. The activities in this flowchart are performed during downtime. Software module A 120 and target release of software module A 140 are shutdown at block 310. Thus, system files, source code and persisted data of these software modules are unlocked and available to be physically switched by the upgrade unit 160 and more specifically by the switch manager 164. This part of the upgrade process is handled in two levels. The first level, illustrated with block 320, is synchronization—a number of system files of software module A 120 are updated with a number of system files of target release of software module A 140. The result is a set of system files corresponding to the definitions and the requirements of the new release, but persisting any important customizations, e.g. user profiles, environment and other parameters setup, business functionalities adjustments, product definitions, etc.

The second level of the physical switch upgrade comprises data migration and is illustrated with block 330. Target release of software module A 140 is a different version and together with the system files changes may also bring changes to data persisting. For example, if software module A 120 persistent data is stored in a database, the target release may use different structure of the database tables. Some of the information may be stored in two columns or in two tables instead of being stored in one column or one table. In addition, the indexes may also differ. One skilled in the art could easily identify other possible scenarios for differences in data persisting between two releases of a software module. In general, persistent data migration should comprise at least two actions—restructuring a plurality of persistent data of software module A 120 to correspond or align with the data persisting structure of the target release, and adapting the restructured data in accordance with the new structure and indexes. The lifecycle of target release of software module A 140 ends with the second level of the physical switch upgrade.

The activities in the physical switch upgrade could differ in another embodiment of the invention. For example, instead of updating system files of software module A 120, the system files of target release of software module A 140 could be updated, and, instead of restructuring and adapting, the persisted data of software module A 120 could be transferred to target release of software module A 140. If this is the approach, the physical switch upgrade ends with replacing software module A 120 with target release of software module A 140 which also ends the lifecycle of the latter as it becomes software module A 120. However, the switch upgrade process continues in the distributed system, and software module A 120 needs to be started at block 340.

Block 350 points out additional setup and configuration of software module 120. These additional activities may include online migration of application data, which cannot be migrated while software module 120 is stopped. In order to run properly for finalizing the upgrade process, software module A 120 is communicating with local release of software module B 150. After the additional setup and configuration of software module A 120, the communication with local release of software module B 125 is terminated at block 360 and the communication with software module B 125 is reestablished at block 370. Now the upgrade process is completed and distributed system 100 goes back to productive mode.

Figure 4:
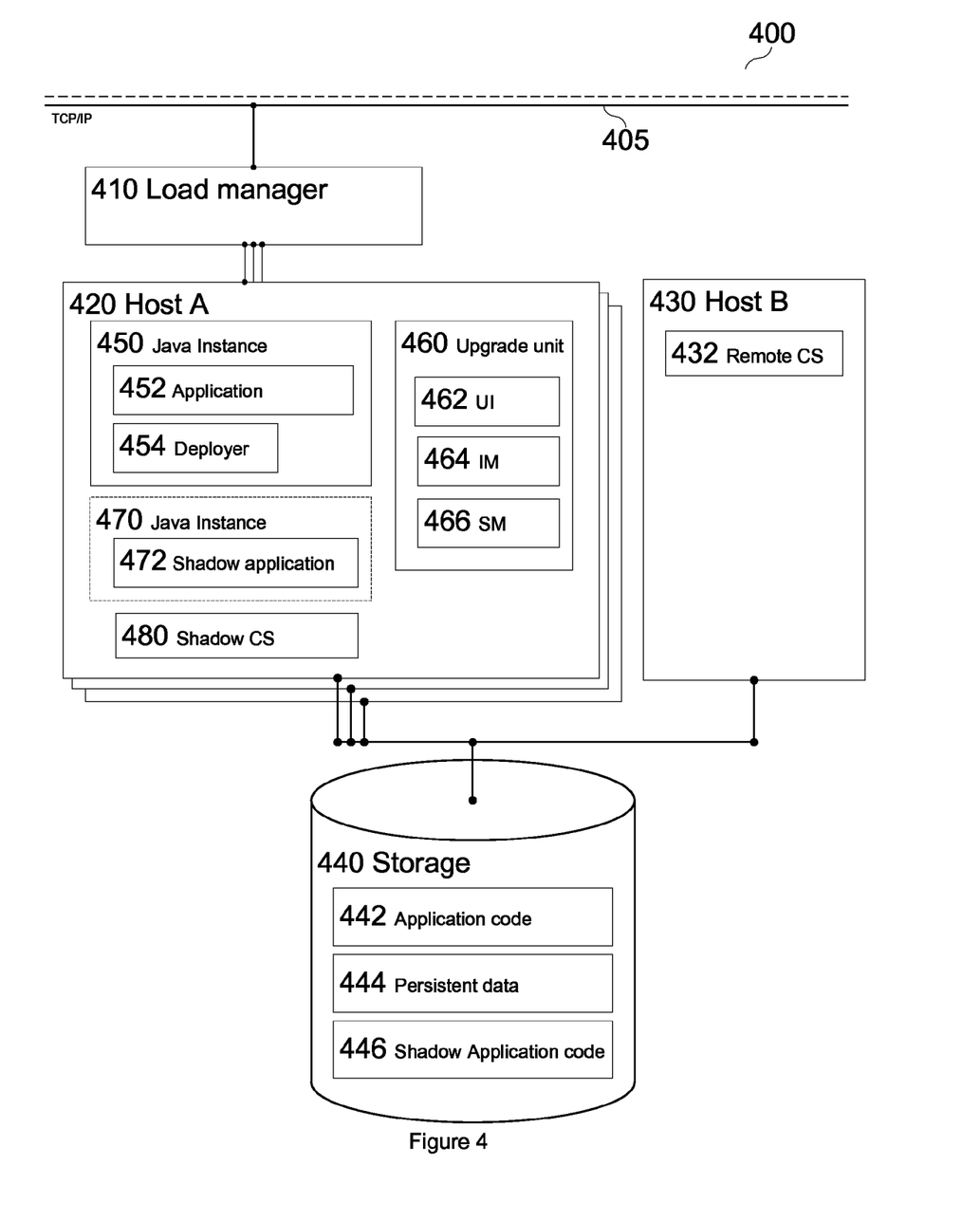
FIG. 4 illustrates a block diagram of another exemplar distributed system in which an embodiment of the invention is implemented.

There are different technologies that may be used for building and executing distributed computer systems. Perhaps the most popular among them are Java Enterprise Edition (Java EE), developed by Sun Microsystems Inc., and .Net, developed by Microsoft Corporation. A number of different vendors continuously further extend the capabilities of the different technologies by development of commercially available distributed systems. The embodiments of the presented invention may vary in accordance with the concrete distributed system architecture. FIG. 4 illustrates an embodiment of the invention in an exemplary distributed system 400 developed by SAP AG applying Java EE technology for implementation of NetWeaver—a platform for running business software applications.

The illustrated distributed system comprises a number of servers that may be configured to run as a cluster—host A 120. The servers presented by host A 120 provide environment where are deployed and executed a number of business software applications which service a plurality of business users. System 400 further comprises dispatcher 410 to receive from network 405 (e.g. local area network (LAN), virtual LAN (VLAN), Internet) business requests to be processed on host A 420. Dispatcher 410 balances the load between the servers represented by host A 120.

At host A 420 is running Java instance 450. A Java instance is a unit in Java EE application server cluster which can be started, stopped and monitored autonomously. The cluster elements that form one Java instance run on one physical machine, and provide runtime environment for various business applications. It is also possible to run several Java instances on one physical machine. In Java instance 450 are executed application 452 and deployer 454 to deploy application 452. When application is deployed, its source code is stored in storage 440 and is accessible from all servers in the cluster. Thus, the application could be executed on each server. Storage 440 may be a database and in addition to application source code 442 may store any kind of persistent data 444 relevant to application execution.

Distributed system 400 further comprises host B 430 to run so called central services (CS) 432. On the figure central services 432 are named remote CS. CS are always required when a java cluster is run as they provide the necessary common services, required to start and execute the cluster. Possible examples for central services in the described context are: Java startup framework to start, stop and monitor Java instances in accordance with instance profiles; Message service to help with load balance in the cluster (host A 420); Enqueue service to manage logical database locks set by the business application. During its lifecycle, application 452 through Java instance 450 is in communication and in dependency relationship with remote CS 432. Therefore, Remote CS 432 has to be manipulated or even modified during switch upgrade of application 452 as well.

The switch upgrade process is managed by upgrade unit 460 which resembles the structure and functions of previously described upgrade unit 160, including user interface 462 (UI), install module 464 (IM), and switch manager 466 (SM). During the upgrade, install module 464 installs and deploys shadow application 472, i.e. the target release of application 452, and shadow CS 480. For installing and deploying shadow application 472 it may be necessary to establish a new Java instance 470 in host A 420. Shadow application 472 is in communication with shadow CS 480 during the deployment, and later during execution. Shadow application code 446 may be persisted on storage 440, but it is not mandatory condition, as the switch upgrade process may be completely executed on one server.

Figure 5:
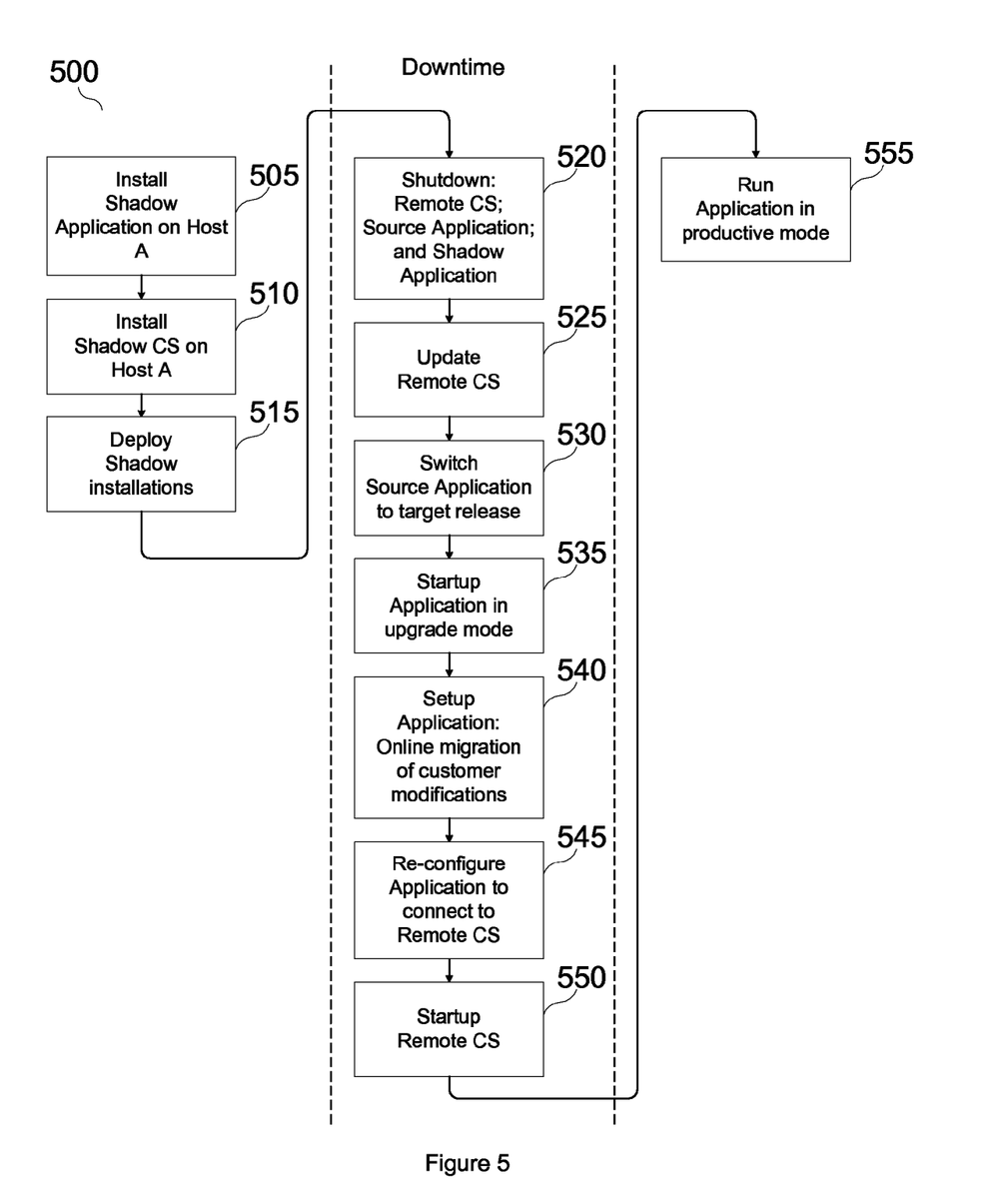
FIG. 5 illustrates a flowchart of a software module switch upgrade according to an embodiment of the invention.

FIG. 5 illustrates flowchart 500 of the entire switch upgrade process, implemented in distributed system 400. The blocks in the flowchart are grouped according to whether they could be executed in a productive mode or require downtime of distributed system 400. The first group includes block 505, illustrating installation of shadow application 452 at host A 420; block 510, illustrating installation of shadow CS 480 at host A 420; and block 515, illustrating the deployment of the shadow installations. When deployed, the shadow installations could be run in communication with each other for additional setup procedures of the target release. All activities in this group take place while distributed system 400 is in production mode and application 452 is available to the business users.

The next group includes the activities of switch upgrade process that are executed when system 400 is in downtime period. In this embodiment of the invention, the switch upgrade requires remote CS 432, application 452 and shadow application 472 to be stopped as illustrated with block 520. Remote CS is stopped in order to be updated in accordance with the target release of application 452—block 525. This is necessary not only for adjusting central services to the new release, but also for updating any data pertinent to host A 420, e.g. instance profiles, binary files, etc.

Next, at block 530 application 452 is switched to target release of shadow application 472 by system files update, and persistent data restructuring and adapting. With that, the lifecycle of shadow application 472 is over and application 452 in its new release is started at block 535 for online application upgrade at block 540. Online upgrade activities may include migration of various application customizations and setup of the new release for productive mode. These activities are done online, i.e. application 452 in its new release is up and running. These activities further may involve interactions with users through user interface 462. Application 452 runs in communication with shadow CS 480 while online application upgrade is performed. Afterwards, application 452 is reconfigured to operate in communication with remote CS 432 at block 545 and with that the switch upgrade is completed. Remote CS is started at block 550 and distributed system 400 is back to productive mode (block 555).

In the above description numerous specific details are set forth to provide a thorough understanding of embodiments of the invention. One skilled in the relevant art will recognize, however that the invention can be practiced without one or more of the specific details or with other methods, components, techniques, etc. In other instances, well-known operations or structures are not shown or described in details to avoid obscuring aspects of the invention.

Reference throughout this specification to "one embodiment" or "an embodiment" means that a particular feature, structure or characteristic described in connection with the embodiment is included in at least embodiment of the invention. Thus, the appearance of the phrases "in one embodiment" or "in an embodiment" in various places throughout this specification are not necessarily all referring to the same embodiment. Furthermore, the particular features, structures or characteristics may be combined in any suitable manner in one or more embodiments.

What is claimed is:

1. A method comprising:
   executing a first software module on a first host and a second software module on a second host, the two software modules being in communication with each other;
   installing during the execution a target release of the first software module and a local release of the second software module on the first host;
   terminating the communication between the first software module and the second software module;
   establishing communication between the first software module and the local release of the second software module within the first host;
   shutting down execution of the first software module;
   upgrading the first software module to the target release; and
   executing the upgraded first software module on the first host, the upgraded first software module in communication with the local release of the second software module within the first host.

2. The method of claim 1 further comprising:
   terminating the communication between the upgraded first software module and the local release of the second software module within the first host; and
   reestablishing communication between the upgraded first software module on the first host and the second software module on the second host.

3. The method of claim 2 further comprising de-installing the local release of the second software module on the first host.

4. The method of claim 1, wherein installing the target release of the first software module and the local release of the second software module further comprises deploying the target release of the first software module and the local release of the second software module.

5. The method of claim 1, wherein upgrading the first software module further comprises:
   shutting down the target release of the first software module;
   switching the first software module to the target release, the target release hereafter referred to as the upgraded first software module;
   starting up the upgraded first software module; and
   setting up the upgraded first software module to operate in a productive mode.

6. The method of claim 5, wherein switching further comprises:
   synchronizing a plurality of system files of the first software module with a plurality of system files of the target release of the first software module;
   restructuring a plurality of persistent data of the first software module to align with the target release; and
   adapting the plurality of persistent data in accordance with the new structure.

7. The method of claim 5 further comprising:
   shutting down the second software module;
   modifying the second software module in accordance with a requirement of the target release of the first software module; and
   starting up the second software module.

8. The method of claim 7 further comprising prompting a user to manually perform one of shutdown or startup the second software module when required.

9. The method of claim 7, wherein modifying the second software module further comprises:
   updating a plurality of system files of the second software module; and
   reconfiguring the second software module to communicate in a productive mode with the upgraded first software module.

10. A system comprising:
    a first software module executed at a first host;
    a second software module executed at a second host, the first and the second software modules being in communication with each other;
    a target release of the first software module at the first host;
    a local release of the second software module at the first host;
    a connection interface at the first host to terminate communication between the first software module and the second software module and establish communication between the first software module and the local release of the second software module; and
    an upgrade unit at the first host to shut down execution of the first software module, upgrade the first software module to the target release, and start up execution of the upgraded first software module, the upgraded first software module in communication with the local release of the second software module.

11. The system of claim 10, wherein the upgrade unit further comprises an install module to install and deploy the target release of the first software module and the local release of the second software module.

12. The system of claim 11 further comprising a de-install interface to de-install the local release of the second software module.

13. The system of claim 10, wherein the upgrade unit further comprises a switch manager to switch the first software module to the target release and setting it up to operate in a productive mode.

14. The system of claim 13 further comprising:
    an interface to shutdown and startup the software module A and the target release of the software module A;

a synchronizer to synchronize a plurality of system files of the first software module with a plurality of system files of the target release of the first software module; and a data interface to restructure a plurality of persistent data of the first software module to align with the target release and to adapt the plurality of persistent data in accordance with the new structure.

15. The system of claim 13 further comprising:

an interface to initiate shutdown and startup of the second software module; and a modifier to modify the second software module in accordance with the requirements of the target release of the first software module.

16. The system of claim 10, wherein the upgrade unit further comprises a user interface to provide interaction with a user to execute operations comprising shutting down and starting up the second software module.

17. A machine readable medium having instructions stored therein which when executed cause a machine to perform a set of operations comprising:

executing a first software module on a first host and a second software module on a second host, the two software modules being in communication with each other;

installing during the execution a target release of the first software module and a local release of the second software module on the first host;

terminating the communication between the first software module and the second software module;

establishing communication between the first software module and the local release of the second software module within the first host;

shutting down execution of the first software module;

upgrading the first software module to the target release;

executing the upgraded first software module on the first host, the upgraded first software module in communication with the local release of the second software module within the first host.

18. The machine readable medium of claim 17, having further instructions stored therein which when executed cause a machine to perform a set of operations further comprising:

terminating the communication between the upgraded first software module and the local release of the second software module within the first host; and reestablishing communication between the upgraded first software module on the first host and the second software module on the second host.

19. The machine readable medium of claim 18, having further instructions stored therein which when executed cause a machine to perform a set of operations further comprising de-installing the local release of the second software module on the first host.

20. The machine readable medium of claim 17, wherein installing the target release of the first software module and the local release of the second software module further comprises deploying the target release of the first software module and the local release of the second software module.

21. The machine readable medium of claim 17, wherein upgrading the first software module further comprises:

shutting down the target release of the first software module;

switching the first software module to the target release, the target release hereafter referred to as the upgraded first software module; and starting up the upgraded first software module; and setting up the upgraded first software module to operate in a productive mode.

22. The machine readable medium of claim 21, wherein switching further comprises:

synchronizing a plurality of system files of the first software module with a plurality of system files of the target release of the first software module;

restructuring a plurality of persistent data of the first software module to align with the target release; and adapting the plurality of persistent data in accordance with the new structure.

23. The machine readable medium of claim 21, having further instructions stored therein which when executed cause a machine to perform a set of operations further comprising:

shutting down the second software module;

modifying the second software module in accordance with a requirement of the target release of the first software module; and starting up the second software module.

24. The machine readable medium of claim 23, having further instructions stored therein which when executed cause a machine to perform a set of operations further comprising prompting a user to manually perform one of shutdown or startup the second software module when required.

25. The machine readable medium of claim of claim 23, wherein modifying the second software module further comprises:

updating a plurality of system files of the second software module; and reconfiguring the second software module to communicate in a productive mode with the upgraded first software module.

* * * * *